US012563337B2

(12) United States Patent
Kaetel

(10) Patent No.: US 12,563,337 B2
(45) Date of Patent: Feb. 24, 2026

(54) LOUDSPEAKER

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 265 days.

(21) Appl. No.: 18/354,116

(22) Filed: Jul. 18, 2023

(65) Prior Publication Data

US 2023/0362536 A1 Nov. 9, 2023

Related U.S. Application Data

(63) Continuation of application No. PCT/EP2022/051258, filed on Jan. 20, 2022.

(30) Foreign Application Priority Data

Jan. 25, 2021 (DE) ..................... 10 2021 200 633.7

(51) Int. Cl.

| | |
|---|---|
| ***H04R 1/34*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............ *H04R 1/345* (2013.01); *H04R 7/127* (2013.01); *H04R 7/18* (2013.01); *H04R 9/025* (2013.01); *H04R 9/045* (2013.01); *H04R 9/06* (2013.01); *H04R 2209/024* (2013.01)

(58) Field of Classification Search

CPC .......... H04R 1/345; H04R 7/127; H04R 7/18; H04R 9/045; H04R 9/025; H04R 9/06; H04R 2209/024

See application file for complete search history.

(56) References Cited

U.S. PATENT DOCUMENTS

| | | | | |
|---|---|---|---|---|
| 2,429,068 | A | 10/1947 | McIver | |
| 10,200,802 | B1 * | 2/2019 | Diehl | H04R 1/02 |
| 2005/0163338 | A1 | 7/2005 | Ohashi | |
| 2018/0234769 | A1 | 8/2018 | Seo | |
| 2020/0275189 | A1 | 8/2020 | Cho et al. | |

(Continued)

FOREIGN PATENT DOCUMENTS

| | | | |
|---|---|---|---|
| CN | 1638529 | A | 7/2005 |
| DE | 19819452 | C1 | 1/2000 |
| EP | 0 771 133 | A1 | 5/1997 |

(Continued)

OTHER PUBLICATIONS

International Search Report dated May 4, 2022, issued in application No. PCT/EP2022/051258.

*Primary Examiner* — Sunita Joshi

(74) *Attorney, Agent, or Firm* — McClure, Qualey & Rodack, LLP

(57) ABSTRACT

A loudspeaker includes two diaphragms arranged opposite each other, a drive unit for deflecting the two diaphragms in response to a control signal, the drive unit being coupled to the two diaphragms such that a first one of the two diaphragms is deflected in a first direction, and a second one of the two diaphragms is deflected in a second direction equal to the first direction.

24 Claims, 15 Drawing Sheets

(56) References Cited

U.S. PATENT DOCUMENTS

2023/0097602 A1* 3/2023 Pfeffer .................. H04R 9/046 381/412

FOREIGN PATENT DOCUMENTS

| | | | | | |
|---|---|---|---|---|---|
| EP | 1 553 802 | A2 | 7/2005 | | |
| EP | 3 061 266 | | 8/2016 | | |
| EP | 2 692 144 | B1 | 2/2017 | | |
| EP | 2 692 154 | B1 | 9/2017 | | |
| EP | 2 692 151 | B1 | 1/2018 | | |
| EP | 3 061 262 | B1 | 1/2018 | | |
| JP | 2010-114833 | A | 5/2010 | | |
| TW | M562543 | U | 6/2018 | | |
| WO | WO-2018056814 | A1 * | 3/2018 | ............ | H04R 9/063 |
| WO | 2020/176361 | A1 | 9/2020 | | |

* cited by examiner

LOUDSPEAKER

CROSS-REFERENCES TO RELATED APPLICATIONS

This application is a continuation of copending International Application No. PCT/EP2022/051258, filed Jan. 20, 2022, which is incorporated herein by reference in its entirety, and additionally claims priority from German Application No. DE 10 2021 200 633.7, filed Jan. 25, 2021, which is incorporated herein by reference in its entirety.

BACKGROUND OF THE INVENTION

The present invention relates to the field of electroacoustics and, more particularly, to concepts for recording and reproducing acoustic signals.

Typically, acoustic scenes are recorded while using a set of microphones. Each microphone outputs a microphone signal. For an audio scene of an orchestra, for example, 25 microphones may be used. Then, an audio engineer mixes the 25 microphone output signals into, for example, a standard format, such as a stereo format, a 5.1, a 7.1, a 7.2, or other equivalent format. In a stereo format, for example, two stereo channels are created by the sound engineer or an automatic mixing process. In a 5.1 format, mixing results in five channels and a subwoofer channel. Similarly, in a 7.2 format, for example, mixing results in seven channels and two sub-woofer channels. If the audio scene is to be rendered in a reproduction environment, a mixing result is applied to electrodynamic loudspeakers. In a stereo reproduction (reproduction) scenario, there are two loudspeakers—the first loudspeaker receiving the first stereo channel, and the second loudspeaker receiving the second stereo channel. In a 7.2 reproduction format, for example, there are seven loudspeakers at predetermined positions and, in addition, two subwoofers that may be placed at relatively arbitrary positions. The seven channels are applied to the corresponding loudspeakers, and the two subwoofer channels are applied to the corresponding subwoofers.

Utilization of a single microphone arrangement in detecting audio signals and, and utilization of a single loudspeaker arrangement in reproducing audio signals typically neglect the true nature of the sound sources. European patent EP 2692154 B1 describes a set for detecting and reproducing an audio scene in which not only translation is recorded and reproduced, but also rotation and, furthermore, vibration. Therefore, an audio scene is not only reproduced by a single detection signal or a single mixed signal, but by two detection signals or two mixed signals, which are recorded simultaneously, on the one hand, and which are reproduced simultaneously, on the other hand. In this manner, it is achieved that different emission characteristics of the audio scene are recorded as compared to a standard recording, and are reproduced in a reproduction environment.

For this purpose, as it is shown in the European patent, a set of microphones is placed between the acoustic scene and an (imaginary) auditorium in order to detect the "conventional" or translation signal, which is characterized by a high directionality or high quality.

In addition, a second set of microphones is placed above or to the side of the acoustic scene to record a low-quality or low directionality signal that is intended to represent the rotation of sound waves as opposed to translation.

On the reproduction side, corresponding loudspeakers are placed at the typical standard positions, each of which loudspeakers exhibits an omnidirectional arrangement so as to reproduce the rotational signal, and exhibits directional arrangement so as to reproduce the "conventional" translational sound signal. Further, there still exists a subwoofer either at each of the standard positions, or only one single subwoofer at any position.

European patent EP 2692144 B1 discloses a loudspeaker for reproducing, on the one hand, the translational audio signal and, on the other hand, the rotational audio signal. The loudspeaker thus exhibits an omnidirectionally emitting arrangement, on the one hand, and a directionally emitting arrangement, on the other hand.

European patent EP 2692151 B1 discloses an electret microphone that may be used to record the omnidirectional or the directional signal.

European patent EP 3061262 B1 discloses an earphone and a method of manufacturing an earphone that generates both a translational sound field and a rotational sound field.

European patent application EP 3061266 A1, which is intended to be granted, discloses an earphone and a method of manufacturing an earphone configured to produce the "conventional" translational sound signal while using a first transducer, and to produce the rotational sound field while using a second transducer arranged to be perpendicular to the first transducer.

Recording and reproduction of the rotational sound field in addition to the translational sound field leads to a significantly improved and, thus, high-quality audio signal perception which almost gives the impression of a live concert, although the audio signal is reproduced by loudspeakers or headphones or earphones.

This results in a sound experience that is almost indistinguishable from the original sound scene, where the sound is not emitted by loudspeakers but by musical instruments or human voices. This is achieved by taking into account that the sound is not only emitted translationally, but also rotationally and, if necessary, also vibrationally, and should therefore be recorded and reproduced accordingly.

SUMMARY

An embodiment may have a loudspeaker, comprising: two diaphragms arranged opposite each other, a drive unit for deflecting the two diaphragms in response to a control signal, wherein the drive unit is coupled to the two diaphragms such that a first one of the two diaphragms is deflected in a first direction and a second one of the two diaphragms is deflected in a second direction equal to the first direction.

Another embodiment may have a method of manufacturing a loudspeaker, comprising: arranging two diaphragms located opposite each other; and providing a drive unit for deflecting the two diaphragms, which respond to a control signal of the drive unit, the drive unit being coupled to the two diaphragms such that a first one of the two diaphragms is deflected in a first direction, and a second one of the two diaphragms is deflected in a second direction equal to the first direction.

Another embodiment may have a method of operating a loudspeaker, comprising: providing a loudspeaker according to the invention, and exciting the two diaphragms to vibrate in unison by applying a signal to the drive unit.

The loudspeaker according to the present invention includes two diaphragms arranged opposite each other. Further, the loudspeaker includes a drive unit for deflecting the two diaphragms in response to a control signal, the drive unit being coupled to the two diaphragms such that a first one of the two diaphragms is deflected in a first direction and a second one of the two diaphragms is deflected in a second direction equal to the first direction. Advantageously, the loudspeaker comprises a connecting rod coupling the two diaphragms to each other; in particular, the connecting rod is in contact with one of the two diaphragms at one end, respectively. One end of the connecting rod may, for example, be connected to a diaphragm by an adhesive film. The connecting rod is advantageously configured as a hollow cylinder. The individual components of the drive unit are advantageously arranged around the connecting rod and within the connecting rod. For example, the drive unit may include a voice coil, a first magnet, a second magnet, and a third magnet. By applying a control signal to the voice coil, a current flows through the voice coil. Due to the arrangement of the first through third magnets on and within the connecting rod as proposed herein, and due to the current flowing through the voice coil, the diaphragms may be deflected in unison with each other during operation. This has the advantage, for example, that in addition to translational vibrations, also rotational vibrations leave the loudspeaker in a mixture that is good for a listener.

A further aspect of the present invention relates to a method of manufacturing a loudspeaker, which includes arranging two diaphragms located opposite each other, and providing a drive unit for deflecting the two diaphragms, which respond to a control signal of the drive unit. Advantageously, the drive unit is coupled to the two diaphragms such that a first one of the two diaphragms is deflected in a first direction, and a second one of the two diaphragms is deflected in a second direction equal to the first direction. In the proposed method, the individual components of the loudspeaker are arranged in such a way that, in addition to the translational sound waves, also rotational sound waves leave the loudspeaker in an increased proportion. This may give a user the impression of witnessing a live concert.

A further aspect of the present invention relates to a method of operating a loudspeaker, which includes providing a loudspeaker as described herein.

Furthermore, the method includes exciting the two diaphragms to vibrate in unison by applying a signal to the drive unit.

With the loudspeaker and method of operating a loudspeaker as described herein, it is possible to achieve, together with a conventional loudspeaker, a sound experience that is almost indistinguishable from the original sound scene in which the sound is emitted by musical instruments or human voices. By means of the proposed loudspeaker it is taken into account, in particular, that the sound is emitted not only translationally, but also rotationally and, if necessary, vibrationally. The loudspeaker according to the invention is particularly suitable for reproducing the rotational components of the sound scene by the two diaphragms located opposite each other but vibrating in unison.

It is understood that individual aspects which are described with respect to the loudspeaker may also be implemented as a method step, and vice versa. Further details will be discussed within the context of the following description of the figures.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
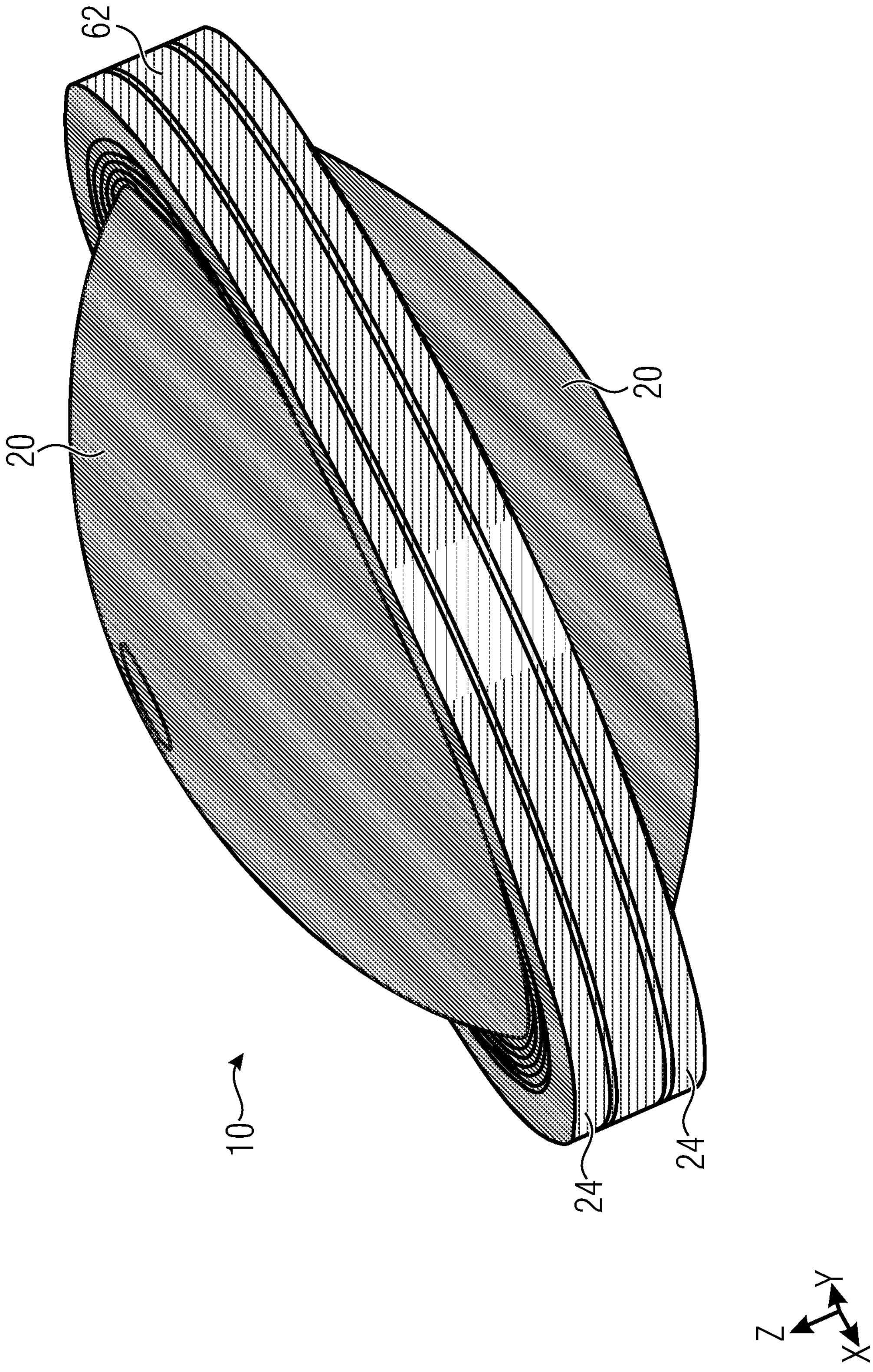
FIG. 1 shows a perspective view of a proposed loudspeaker from the outside.

Individual aspects of the invention described herein will be described below in FIGS. 1 to 16. In the present application, identical reference numerals relate to elements that are identical or identical in action, and not all reference numerals will be presented again in all drawings in case they are repeat themselves.

The loudspeaker 10 described herein is shown in FIGS. 1 to 13, while individual details can be gathered from each of FIGS. 1 to 13. A synopsis of FIGS. 1 to 13 reveals the concept of the loudspeaker described herein, although not every detail is seen in each of FIGS. 1 to 13. A synopsis of FIGS. 1 to 13 makes it possible to realize the setup of the proposed loudspeaker in detail.

Figure 2:
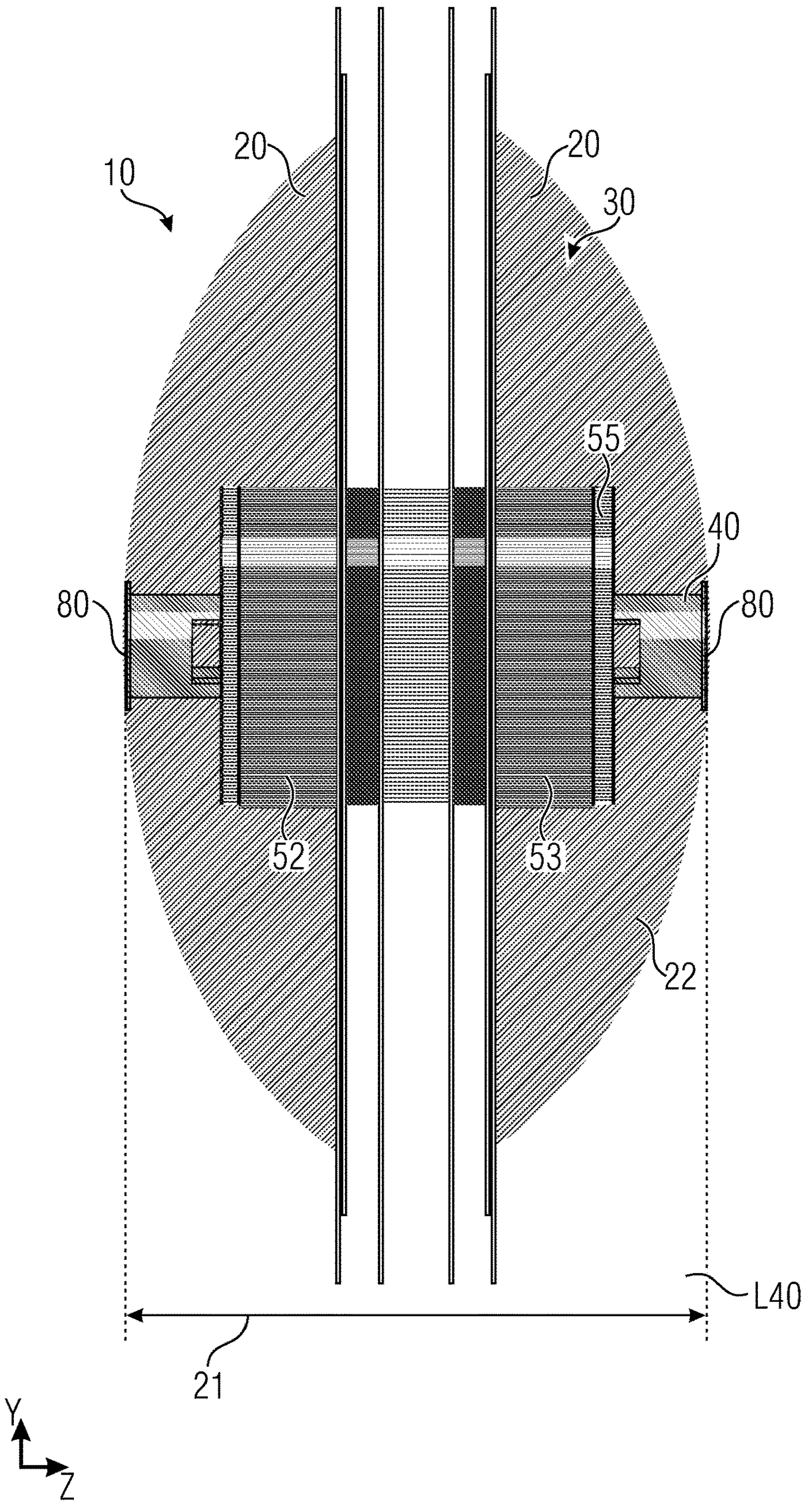
FIG. 2 shows a side view of a proposed loudspeaker with the drive unit being shown to be visible and the diaphragms being shown to be transparent.
Figure 11:
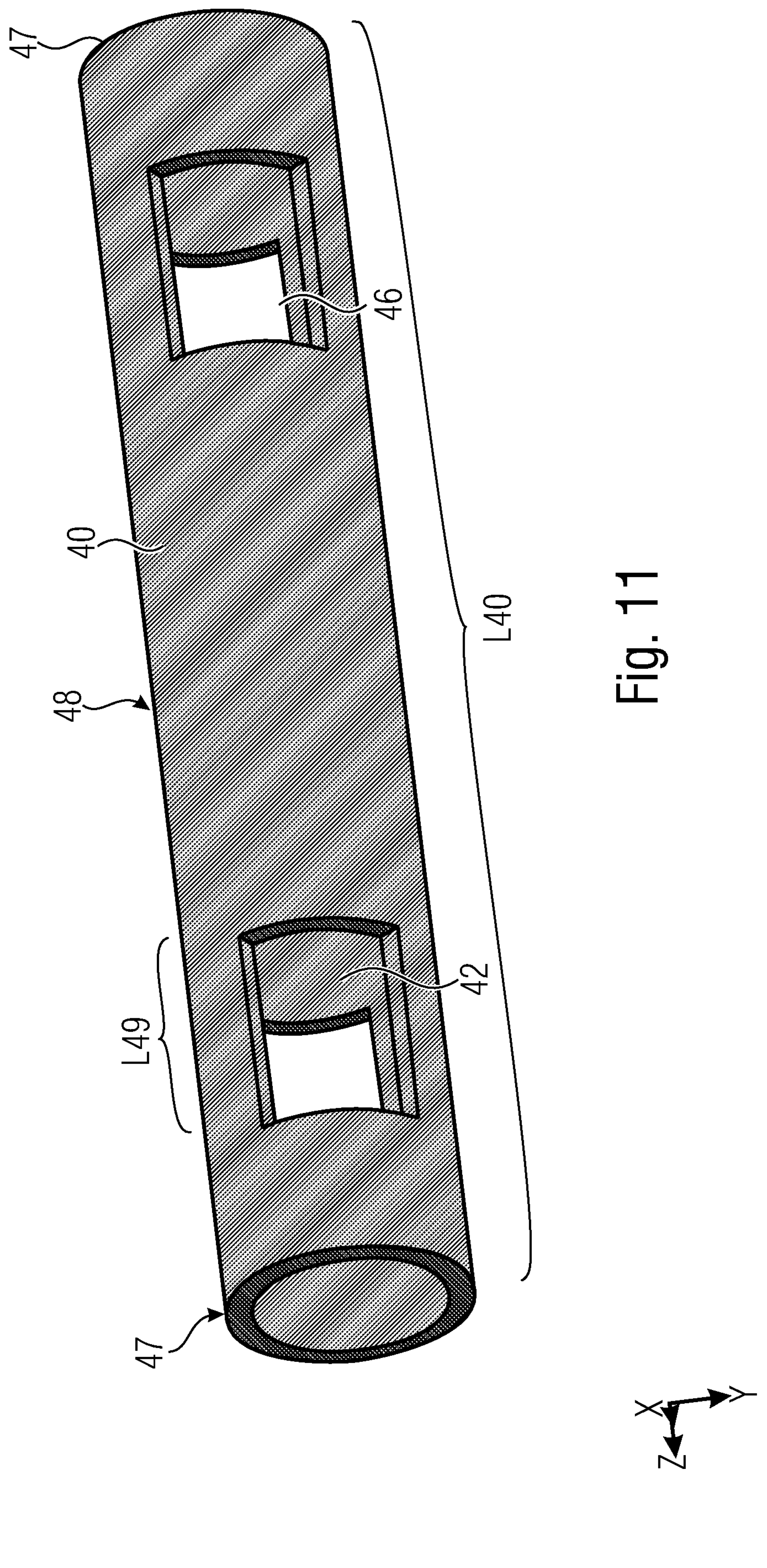
FIG. 11 shows a perspective view of a connecting rod.

FIGS. 1 and 2 show a loudspeaker 10 proposed herein, with FIG. 1 showing a perspective external view of the loudspeaker 10, and FIG. 2 showing an internal setup of the loudspeaker 10 in side view. Looking at FIGS. 1 and 2 together, the following setup of the loudspeaker 10 can be inferred: the loudspeaker 10 includes two diaphragms 20 arranged opposite each other. Further, the loudspeaker 10 includes a drive unit 30 for deflecting the two diaphragms 20 in response to a control signal, the drive unit 30 being coupled to the two diaphragms 20 such that a first one of the two diaphragms 20 is deflected in a first direction and a second one of the two diaphragms 20 is deflected in a second direction equal to the first direction. The diaphragms 20 may be deflected in unison during operation. For this purpose, the drive unit 30 is arranged between the two diaphragms 20, i.e. between the first and second diaphragms 20. In particular, the elements or the components of the drive unit 30 are arranged within and around a connecting rod 40. In particular, the connecting rod 40 is an element of the drive unit 30, i.e. is part of the drive unit 30. As can be seen in FIG. 2, the connecting rod 40 spaces the first and second diaphragms 20 apart from each other. A length L40 of the connecting rod 40 (as can be seen in FIG. 11) determines the mutual distance between the centers of the diaphragms 20. With its first end, i.e. a first end point 80, the connecting rod 40 contacts one of the two diaphragms 20, and with the second end point 80 the connecting rod 40 contacts the other one of the two diaphragms 20. In other words, as can be seen in FIG. 2, one end point 80 of the connecting rod 40 contacts a center of a diaphragm 20, respectively. Within the present context, an end point 80 of the connecting rod is to be understood as an end region which lies, respectively, within a plane perpendicular to an axial axis of the connecting rod 40 that extends through the end point 80. In particular, the end region is spanned by the circumference of the connecting rod 40 within this plane.

Advantageously, the drive unit 30 is configured to rigidly couple the first and second diaphragms 20. For this purpose, the drive unit 30 or the connecting rod 40 has the length L40, which extends along a z axis as shown in FIG. 2. In FIGS. 1 to 13, the z axis is parallel to the axial axis of the connecting rod 40. In FIG. 2, the length L40 is indicated by the double arrow 21. The two diaphragms 20 are spaced apart by the length L40. In other words, the two diaphragms 20 are located opposite the connecting rod 40, which is part of the drive unit 30, at a distance of the length L40, thereby defining a space 22 in which the sound waves may originate. The drive unit 30 is arranged within the space 22 between the diaphragms 20. In addition, the drive unit 30 has the connecting rod 40, which is coupled to the first diaphragm 20 at one end, and is coupled to the second diaphragm 20 at its other end, the other components of the drive unit 30 being arranged within and around the connecting rod 40 between the two diaphragms 20.

FIG. 11 shows a perspective view of a connecting rod 40. As shown in FIG. 11, the connecting rod 40 is configured as a hollow cylinder 42. Thus, for rigid coupling, the drive unit 30 of the proposed loudspeaker 10 comprises the connecting rod 40 which is configured as a hollow cylinder 42 and which is coupled to the first diaphragm 20 at one end and is coupled to the second diaphragm 20 at its other end.

Figure 3:
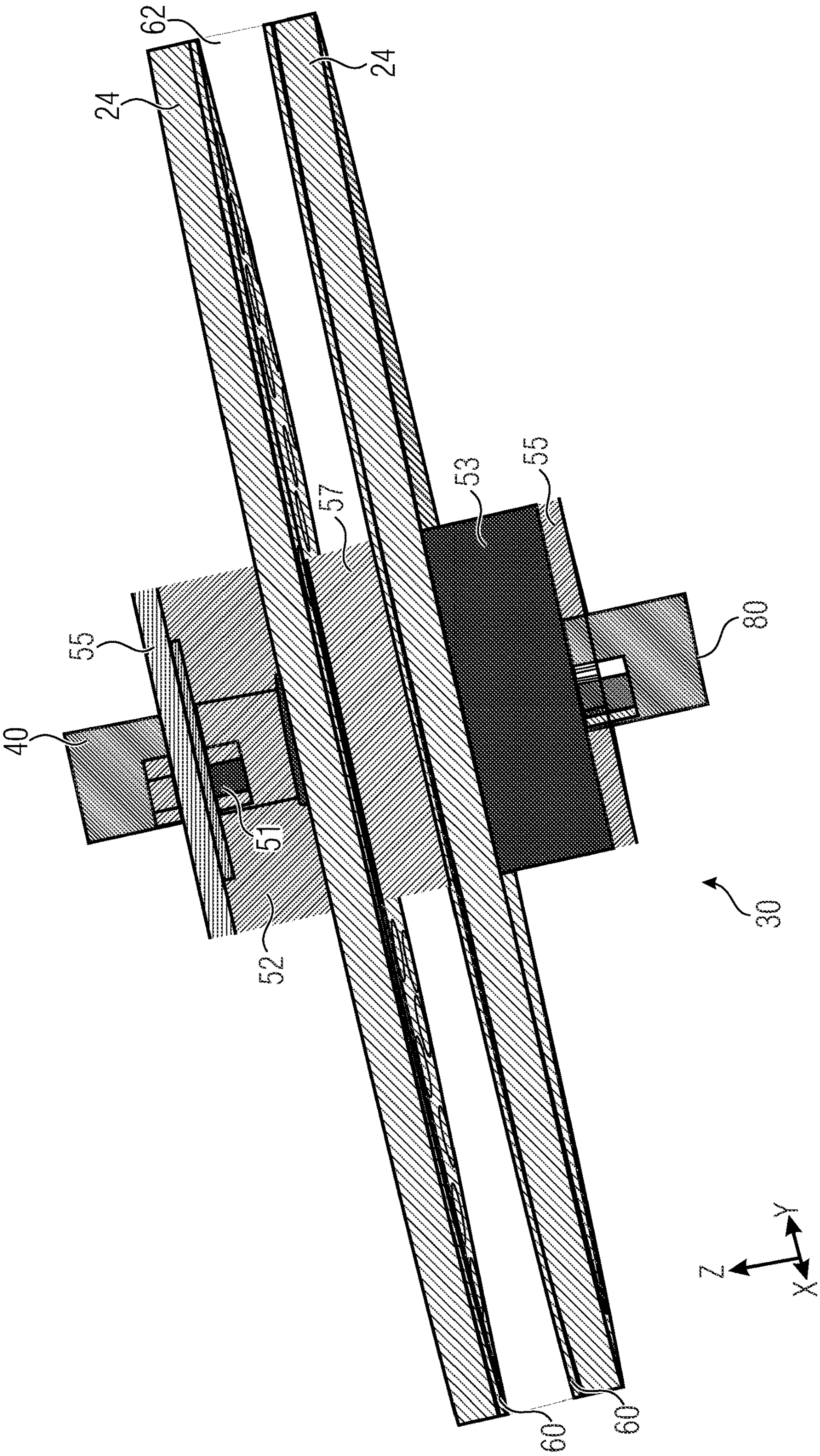
FIG. 3 shows a side view of a proposed loudspeaker without the diaphragms.
Figure 4:
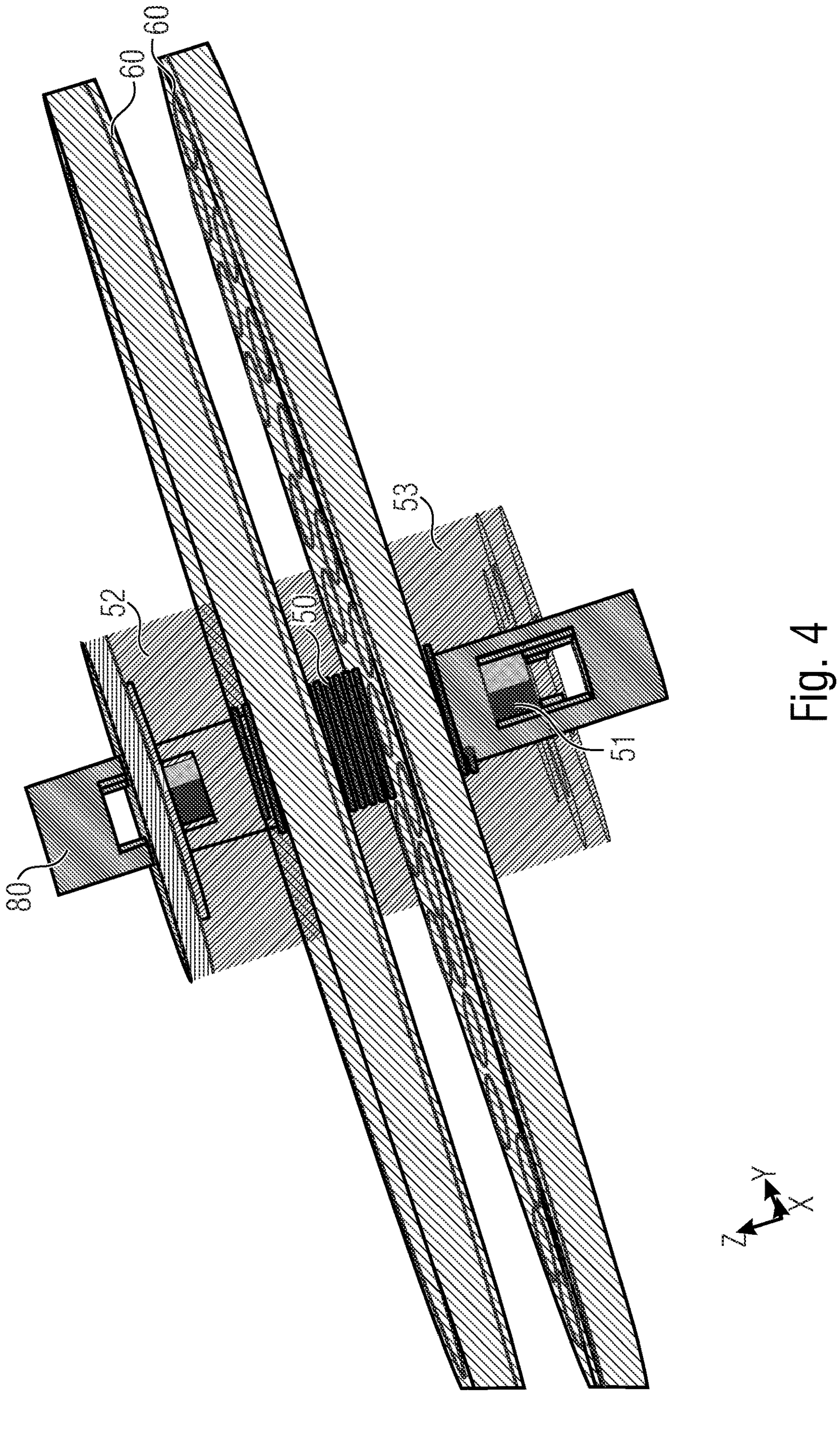
FIG. 4 shows another side view of a proposed loudspeaker without the diaphragms.
Figure 6:
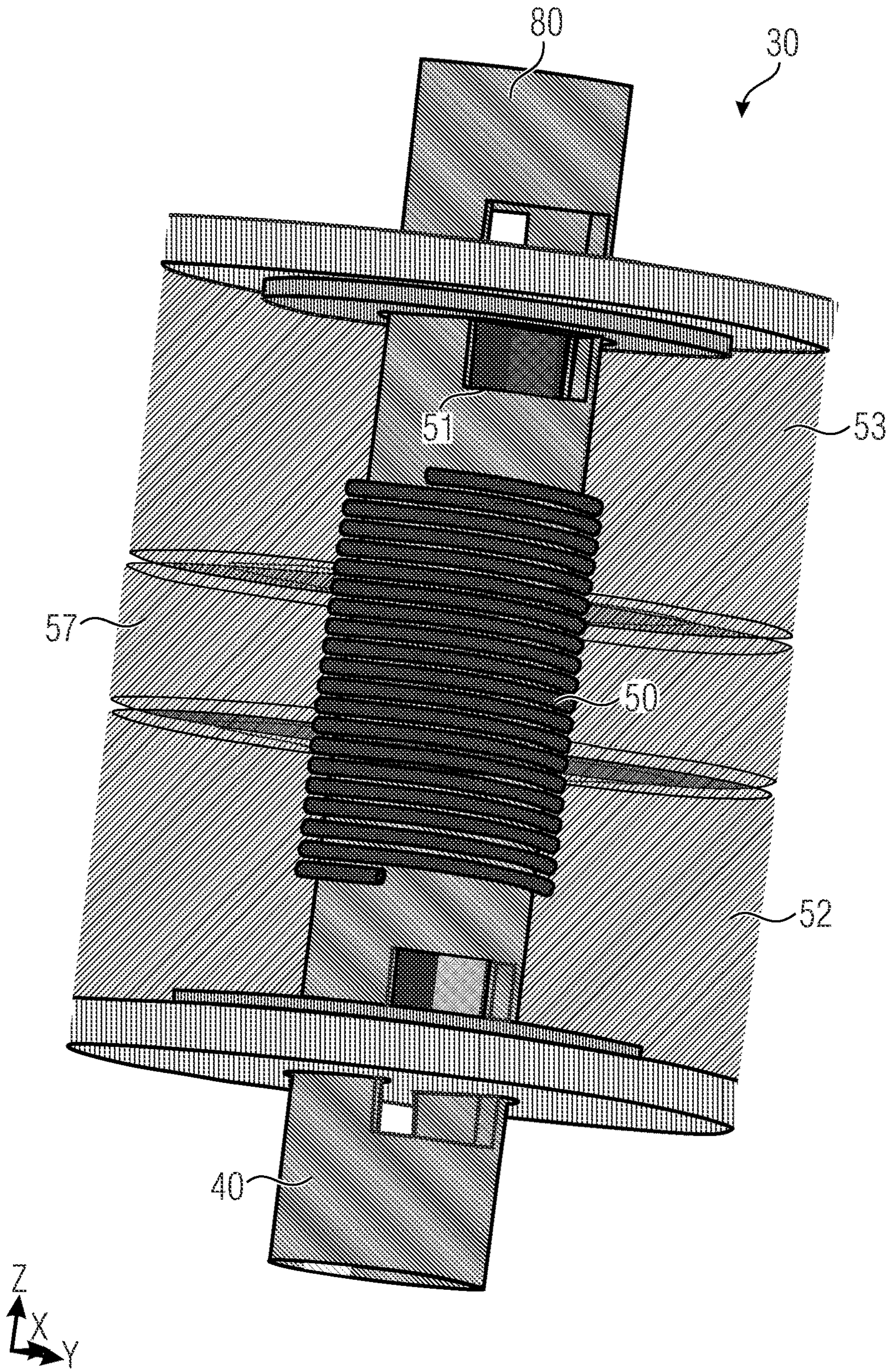
FIG. 6 shows a partially transparent view of the drive unit included in a proposed loudspeaker.
Figure 7:
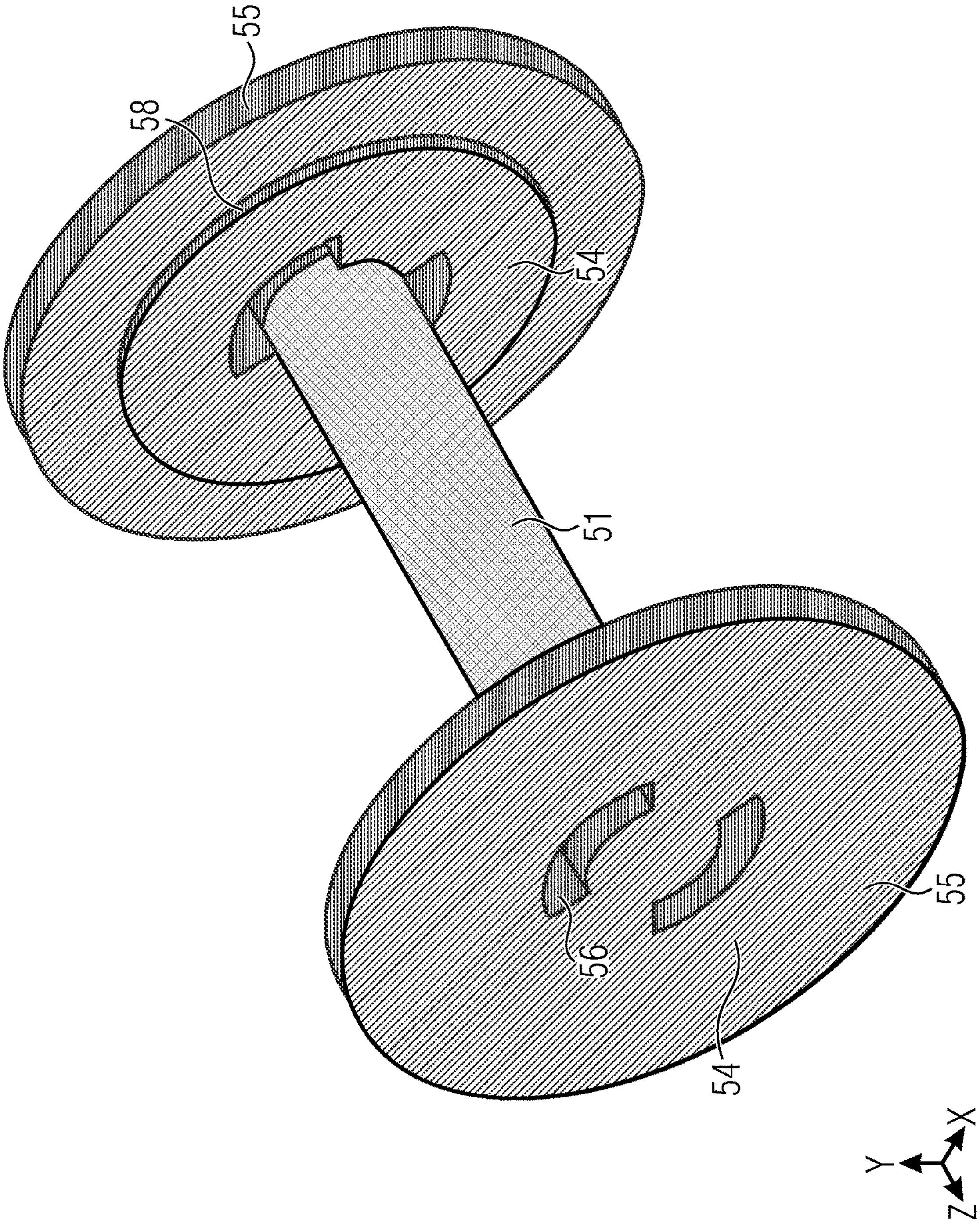
FIG. 7 shows a first magnet of the drive unit that is arranged between two oppositely located magnet holders.

Advantageously, the drive unit 30 includes first, second, and third magnets 51, 52, 53 and a voice coil 50 located in a magnetic field of the magnets 51, 52, 53. The second and third magnets 52, 53 can be seen, for example, in FIG. 2, FIG. 9 and FIG. 13. In FIG. 3, the second magnet 52 is indicated as a transparent magnet for illustration reasons, while the first magnet 51 and the third magnet 53 are shown as solid magnets in FIG. 3. In FIGS. 4 and 6, the second and third magnets 52, 53 are shown as transparent magnets. By showing the magnets 52, 53 as transparent, the structure of the drive unit 30 within the magnets 52, 53 is visible. It can further be seen from said figures that the first magnet 51 is arranged within the connecting rod 40, while the second and third magnets are arranged around the connecting rod 40. It may also be seen from FIGS. 4 and 6 that the second and third magnets 52, 53 are each at least partially arranged around the voice coil 50. The voice coil 50, in turn, is advantageously arranged around the connecting rod 40.

Lengths L, which will be introduced below, refer to a length along the z axis or the axial axis of the drive unit 30 or of the connecting rod 40. The nomenclature of the lengths of the various components is composed of the letter L and the corresponding reference numeral of the component. For example, a length L of the connecting rod 40 is designated by L40.

For example, FIGS. 7, 9, 10, 13 show that advantageously the first magnet 51 is configured as a solid cylinder 44. The first magnet 51 is arranged within the connecting rod 40 and has a smaller length L51 than the connecting rod 40. By L51 is meant the length of the first magnet. In other words, $L51 < L40$ applies. This can be seen, for example, in FIGS. 3, 4, 6, 12 and 13. The length of the connecting rod L40 can be seen in FIG. 11 and determines the mutual distance between the two diaphragms 20 (see also FIG. 2).

Advantageously, the second and third magnets 52, 53 are hollow cylindrical magnets which are each arranged around the connecting rod 40 and each have a length smaller than that of the connecting rod 40. The lengths of the second and third magnets 52, 53 are marked by L52 and L53, respectively. The hollow cylindrical configuration of the second and third magnets 52, 53 can be seen in FIGS. 9 and 10. The sum of the lengths L52, L53 of the second and third magnets 52, 53 is smaller than the length L40 of the connecting rod 40, in other words: $L52 + L53 < L40$. This fact may be gathered from FIG. 2, for example. Furthermore, the sum of the lengths of the second and third magnets 52, 53 is smaller than a length of the first magnet 51. This fact may be gathered from FIGS. 2 to 4, for example. In FIG. 4, the second and third magnets are shown as transparent magnets which partially surround the voice coil 50. In other words, advantageously the second and third magnets 52, 53 are at least partially arranged around the voice coil 50.

Figure 12:
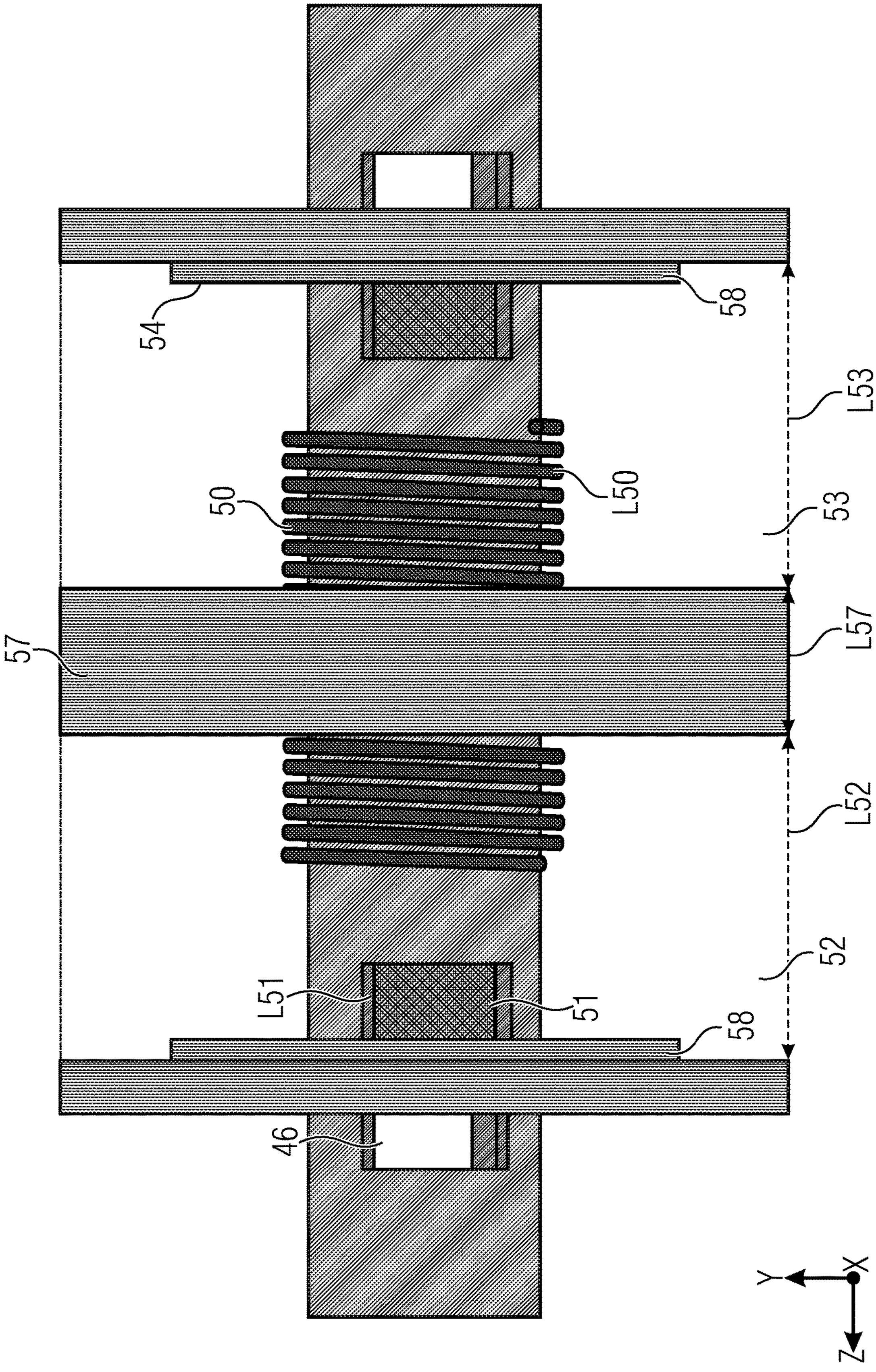
FIG. 12 shows a side view of the connecting rod according to FIG. 11, wherein some of the elements of the drive unit arranged on or within the connecting rod.

In FIG. 12, for example, the second and third magnets 52, 52 are indicated by the dashed lines. From FIG. 12, for example, one may gather what is meant by partial arrangement of the second and third magnets 52, 53 around the voice coil 50, namely that the second and third magnets 52, 53 each overlap with one end of the voice coil 50 and otherwise overlap directly with the connecting rod 40. For example, the second magnet has a length L52, and the third magnet 53 has a length L53, L52 advantageously being equal to L53. Furthermore, the first magnet 51 within the connecting rod 40 also has the length L51. The voice coil 50 also has a length L50. In terms of the mutual relationship of the magnets 51, 52, 53 and the voice coil 50, the following ratios are advantageously maintained:

$$L50 < L51;$$

$$L52 < L51,\ L53 < L51;$$

$$L52 + L53 < L51; \text{ and}$$

$$L52 + L53 \leq L50.$$

The control signal may be applied to the voice coil 50. In the proposed loudspeaker 10, the voice coil 50 is arranged around the connecting rod 40 to move the connecting rod 40 with respect to the magnets 51, 52, 53 by applying the control signal so that the two diaphragms 20 are excited to vibrate in unison. The components of the drive unit 30 are rigidly coupled via the connecting rod 40. For this purpose, the connecting rod 40 has recesses 46 within which the connecting rod 40 together with the voice coil 50 may move in relation to the three magnets 51, 52, 53. For example, FIGS. 11 and 12 show the recesses 46 of the connecting rod 40.

For example, as shown in FIGS. 2 and 3, advantageously the second and third magnets 52, 53 are each engaged, at one end thereof, respectively, with magnet holders 54, 55 which engage with each other after assembly, the magnet holders 54, 55 each being coupled to the connecting rod 40. Advantageously, therefore, two magnet holders 55 are provided. At the respective other ends of the second and third magnets 52, 53, the magnets 52, 53 are in contact with a magnet spacer 57. This may be gathered from FIGS. 2 and 3, for example. FIGS. 2 and 6 further show that the magnet spacer 57, which is indicated only as a transparent magnet spacer 57 in FIG. 6, is arranged around the voice coil. A length L57 of the magnet holder 57 is smaller than the length L50 of the voice coil 50, i.e. L57<L50.

Further advantageously, the first magnet 51 has one of its ends engaged with a magnet holder 54, which is an inner magnet holder in relation to a magnet holder 55, and has its other end engaged with the second magnet holder 54. The magnet holder 54 is an inner magnet holder in relation to the magnet holder 55, which is an outer magnet holder. The magnet holders 54 and 55 are two magnet holders which are configured such that they engage positively with each other after assembly. This fact can be seen in FIG. 7.

Figure 8:
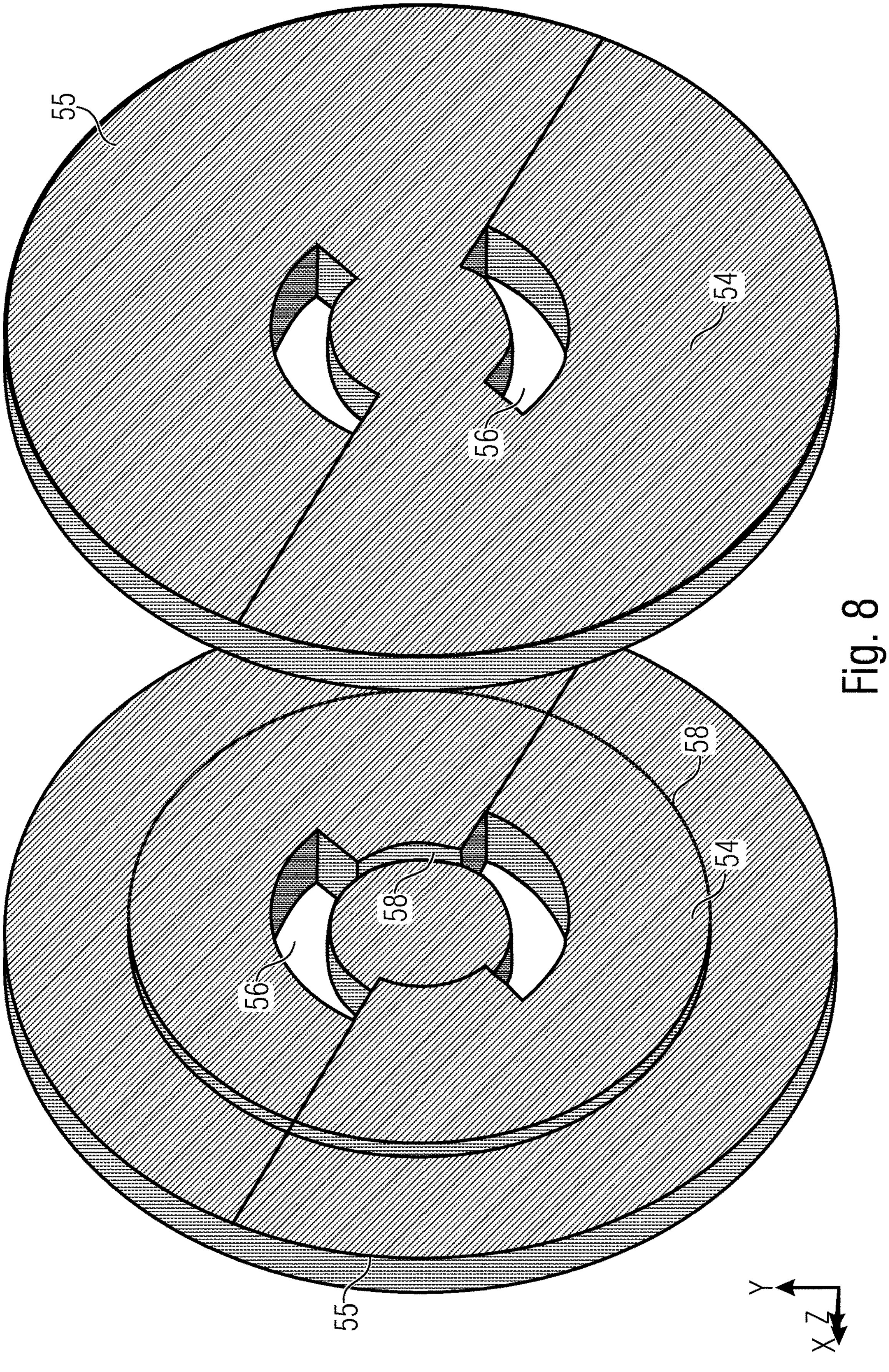
FIG. 8 shows an enlargement of the two oppositely located magnet holders shown in FIG. 7.
Figure 9:
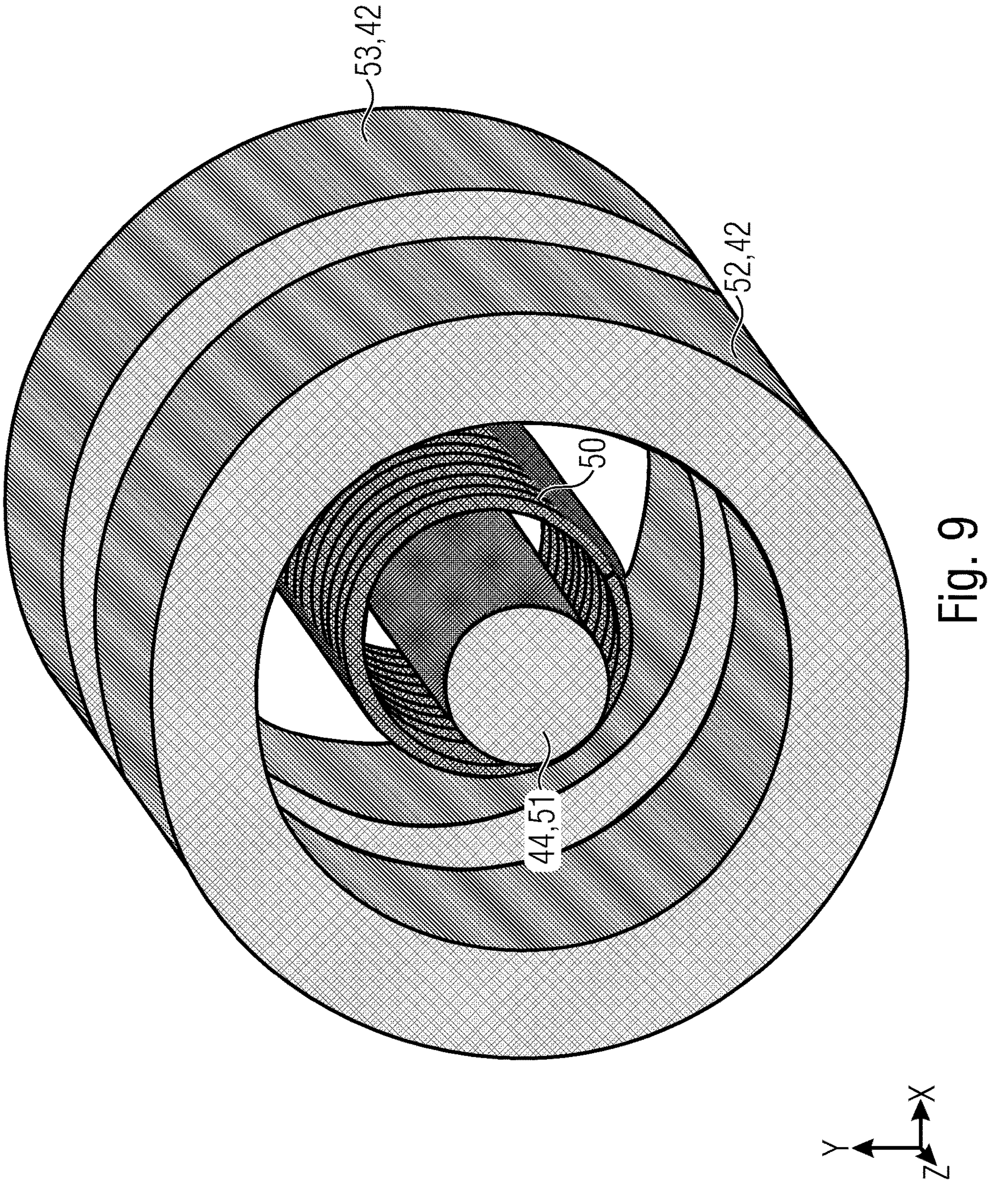
FIG. 9 shows a perspective view of the first, second, and third magnets and of the voice coil of the drive unit, which are included in a proposed loudspeaker.
Figure 10:
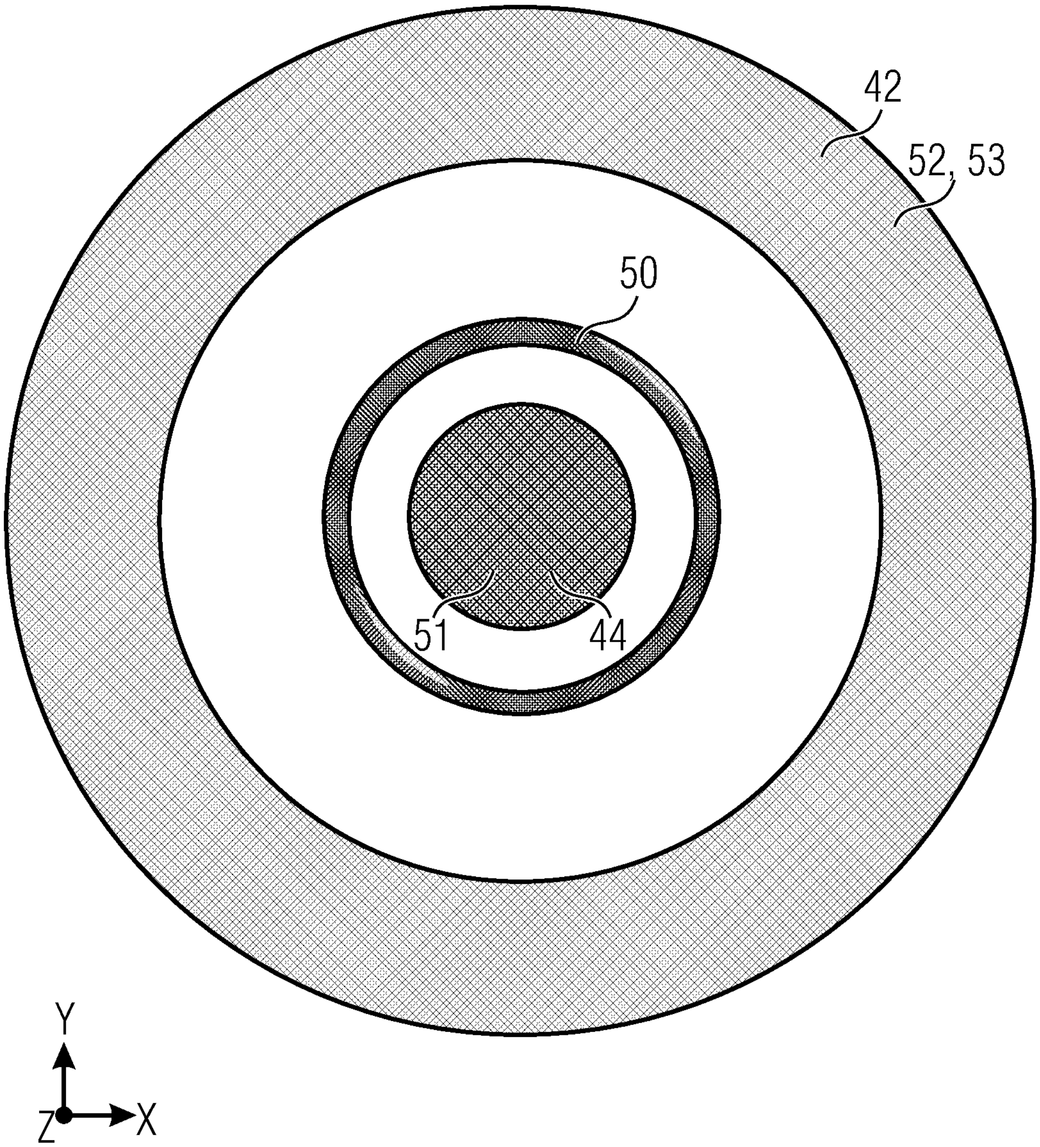
FIG. 10 shows a top view of the first magnet, of the voice coil surrounding the first magnet, and of the second or third magnet surrounding the voice coil according to FIG. 9.

Coupling of the magnet holders 54, 55 to the connecting rod 40 can be seen from the synopsis of FIGS. 8, 11 and 12. Each magnet holder 54 has two magnet holder recesses 56, which can be seen in FIG. 8. Through these magnet holder recesses 56, the connecting rod, which also has recesses 46, may be connected to the former, in particular, they may be inserted into one another, as shown in FIGS. 11 and 12. Such inserting into one another may be carried out, in particular, during manufacturing of the loudspeaker 10. The magnet holders 54, 55 have reliefs 58 after mutually engaging same for receiving the magnets 51, 52, 53, as can be seen in FIG. 8, for example. The reliefs 58 may be configured as recesses or protrusions.

The reliefs 58 are configured by inserting the inner magnet holder 54 and the outer magnet holder 55 into each other. Advantageously, the reliefs 58 are configured in such a way that the magnets 51, 52, 53 come to rest securely between the magnet holders 54, 55. It is conceivable that the magnets 51, 52, 53 cannot perform any translation, i.e. cannot move along the z axis. However, it may be that the magnets can perform rotational movements, i.e. within an x-y plane. For this purpose, the reliefs 58 are configured symmetrically. Advantageously, the mutually engaging magnet holders 54, 55 each engage into a recess 46 of the connecting rod 40, the recesses 46 of the connecting rod 40 being mounted closer to an end 47 of the connecting rod than to the center 48 of the connecting rod. The latter may be seen, for example, in FIG. 11.

Further advantageously, the recesses 46 extend along the length of the connecting rod so that the connecting rod 40 with the voice coil 50 mounted on the connecting rod 40 moves along the length L46 of the recesses 46 in response to a control signal in relation to the three magnets 51, 52, 53. The voice coil 50 is presently arranged around the connecting rod 40, the voice coil 50 being coupled to the connecting rod 40 so that the connecting rod may move together with the voice coil in the magnetic field of the first to third magnets 51, 52, 53. For coupling the voice coil 50 to the connecting rod 40, an inner diameter of the voice coil 50 may be almost exactly matched to an outer diameter of the connecting rod 40 almost exactly, i.e., within tolerable error limits. The length L46 of the recesses 46, as shown for example in FIG. 11, is configured to be long enough to allow the connecting rod to move in relation to the magnets 51, 52, 53 when a signal is applied within the recesses 46. For example, the possible distance of movement may be roughly half the length L46/2 of the recesses 46, as shown in FIG. 12, for example. FIG. 12 shows, for example, a resting position of the drive unit 30. The resting position is that position which the drive unit 30 assumes when no signal is applied to the voice coil 50. This allows, for example, the connecting rod to move in opposite directions along its axial axis, which is depicted along the z direction here. This may deflect the diaphragms 20, i.e. excite them to vibrate.

Advantageously, a magnetic spacer 57 is arranged between the second and third magnets 52, 53, as can be seen, for example, in FIG. 12. The magnetic spacer 57 is configured as a hollow cylinder and encloses the voice coil 50. The magnetic spacer 57 further has a length L57, wherein the length L57 of the magnetic spacer 57 is smaller than the length of the voice coil L50, i.e., L57<L50 applies. Moreover, the length of the magnet spacer 57 is smaller than a length of a magnet 51, 52, 53, i.e., L57<L51, L57<L52, and L57<L53 holds true. This feature may be gathered from FIG. 12; in FIG. 12, the second and third magnets are indicated by the dashed lines. In this manner, it is achieved that the second and third magnets 52, 53 are and remain spaced apart from each other, on the one hand. On the other hand, it may be achieved by this that the second and third magnets 52, 53 only partially surround the voice coil 50 along their lengths L51, L52, respectively. Hereby, when a control signal is applied to the voice coil 50—for the duration of the application of the control signal—a continuous movement of the connecting rod 40 between the diaphragms 20 may be achieved, which are thereby excited to perform vibrations, during which translational as well as rotational sound waves are generated.

Figure 5:
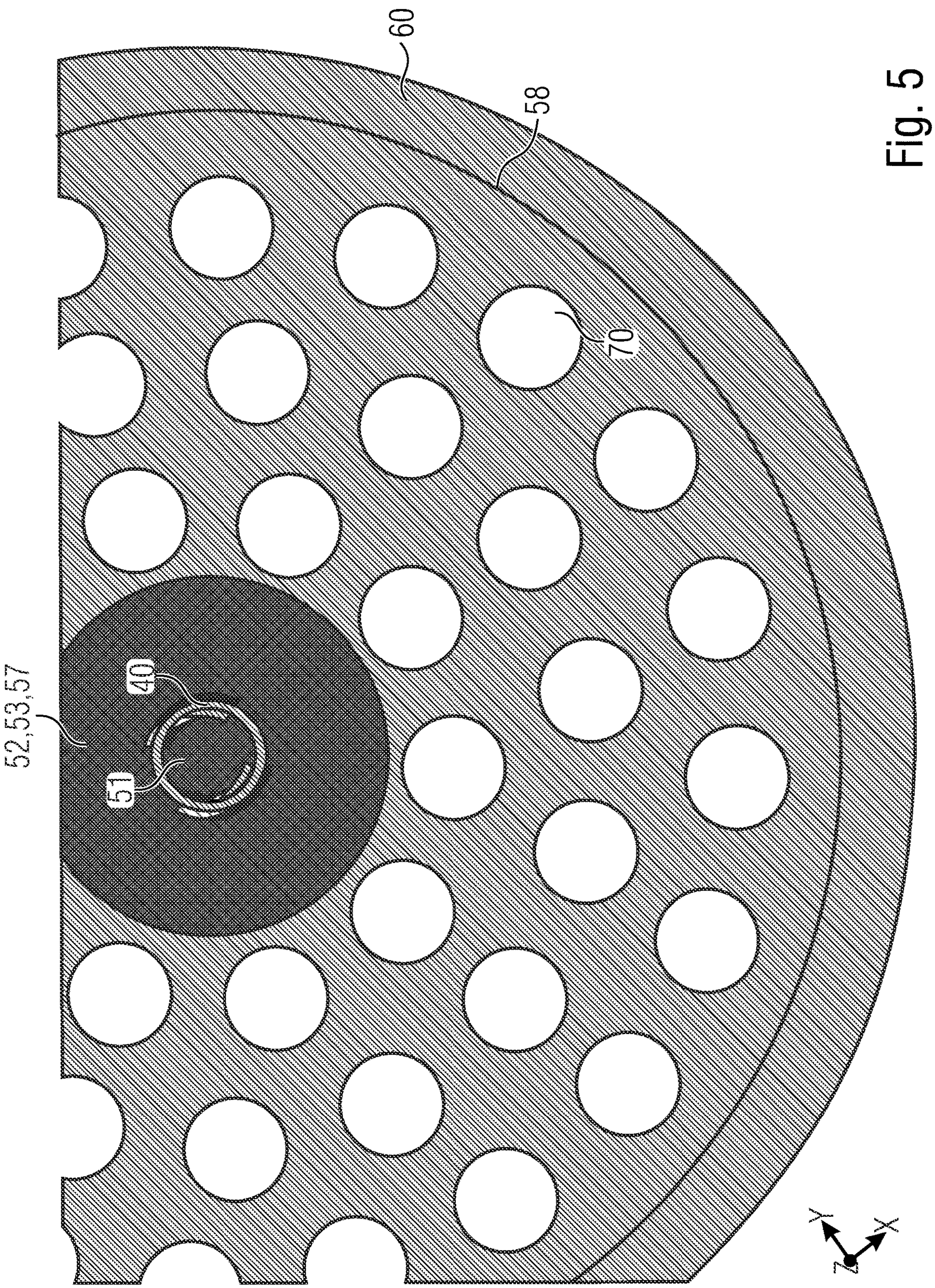
FIG. 5 shows an enlargement of a grille included in a proposed loudspeaker.

Advantageously, the loudspeaker 10 comprises a first and a second grille 60, each grille 60 being located opposite one of the two diaphragms 20, as shown in FIGS. 2 and 4 to 6, for example. FIG. 5 shows an enlargement of a grille 60. As FIG. 5 shows, the grille 60 has a recess in the center so that, for example, the second magnet 52, the third magnet 53 or a magnet spacer 57 may be engaged, with its outer circumference, with the recess of the grille 60. At the same time, the recesses 56 of the magnet holders 54, 55 are coupled to the connecting rod 40, with the second magnet 52, the magnet spacer 57 and the third magnet 53 being arranged between the two oppositely located pairs of magnet holders 54, 55. Thus, two magnet holders 54 and two magnet holders 55 are described. This can be seen, for example, from the synopsis of FIGS. 5 to 8. The grille 60 may further comprise a relief 58, as shown in FIG. 5, for example. The relief 58 is advantageously arranged at an outer circumference of the grille 60.

Advantageously, each grille 60 has a plurality of perforations 70 to allow for pressure equalization when the two diaphragms 20 are excited to vibrate in unison. The perforations 70 may be circular, for example, as shown in FIG. 5. It is further conceivable that the perforations may have a different shape, such as rectangular or n-cornered, where n is a natural number greater than 2. Advantageously, each perforation 70 has a diameter of 0.1 cm to 0.9 cm. With these diameters of the perforations 70, good pressure equalization may take place, while at the same time the grille 60 or the grilles 60 provide the loudspeaker 10 with sufficient to good stability. As can be seen, for example, from FIG. 2, one grille 60 of the two grilles 60 is arranged between the magnet spacer 57 and the second or third magnet 52, 53 in each case. A grille 60 may be made of a plastic, metal or other material.

Advantageously, each diaphragm 20 is attached, at its outer circumference, to a diaphragm holder 24 at one end, and is connected to a grille 60 in a region of the diaphragm holder 24 that is located opposite the outer circumference, as shown in FIGS. 2 to 4, for example. The diaphragm holder 24 engages with the grille 60 via the relief 58. Further advantageously, a spacer 62 is arranged in the region of the drive unit 30, which spacer 62 is connected, at its outer circumference, to one of the two grilles 60 on both sides in each case. In other words, the spacer 62 is arranged between the two grilles 60. Advantageously, the spacer 62 and the magnetic spacer 57 are arranged one above the other or one behind the other around the connecting rod 40, as can be seen, for example, in the synopsis of FIGS. 2 to 4. The diaphragm holders 24 and/or the spacer 62 provide stability to the loudspeaker 10 in a perimeter region between the two diaphragms 20, on the one hand, and they seal the drive unit 30 from an external environment, on the other hand. In other words, the diaphragm holders 24 and/or the spacer 62 protect the drive unit from external influences.

Advantageously, the diaphragm holders 24, the grilles 60, the spacer 62, and the diaphragms 20 have a diameter of between 10 cm and 30 cm, advantageously between 15 cm and 25 cm, and particularly advantageously of 20.32 cm (8 inches). The diaphragm holder 24, the grilles 60, the spacer 62, and the diaphragms 20 may each have reliefs 58 which are configured to be complementary to one another such that the corresponding components, in this case in particular the diaphragm holder 24, the grilles 60, the spacer 62, and the diaphragms 20, may simply be inserted on top of or into one another. Due to its size, which is small compared to known loudspeakers, the proposed loudspeaker may be easily installed into another system, such as a vehicle or the like, while providing a listener with an impression of witnessing a live experience. This is because the proposed loudspeaker 10 may emit both translational vibrations and rotational vibrations, despite or because of its size.

Advantageously, the connecting rod 40 centrally extends through the two grilles 60 from the one diaphragm 20 to the other diaphragm 20. This can be seen, for example, in FIG. 2. The length L40 of the connecting rod 40 assists in spanning a space 22 between the diaphragms 20 within which the air mass displaced by the movement of the connecting rod 40 may move.

Advantageously, the two grilles 60 and the second and third magnets 52, 53 have the magnet spacer 57 arranged therebetween, respectively, which at least partially surrounds the voice coil 50. On the one hand, the magnet spacer 57 spaces the second and third magnets 52, 53 apart from each another, so that the geometrical arrangement of the first to third magnets 51, 52, 53 results in an inhomogeneous magnetic field in which the connecting rod may move when a control signal is applied. On the other hand, the spacer 57 provides the drive unit 30 with stability. The first to third magnets 51, 52, 53 may be permanent magnets.

Advantageously, the perforations 70 are arranged on the grilles 60 in a region outside an outer circumference of the magnetic spacer 57. Further advantageously, the perforations 70 are arranged between the recess in the center of the grille 60 and a relief 58 of the grille 60. This is shown in FIG. 5, for example.

Figure 13:
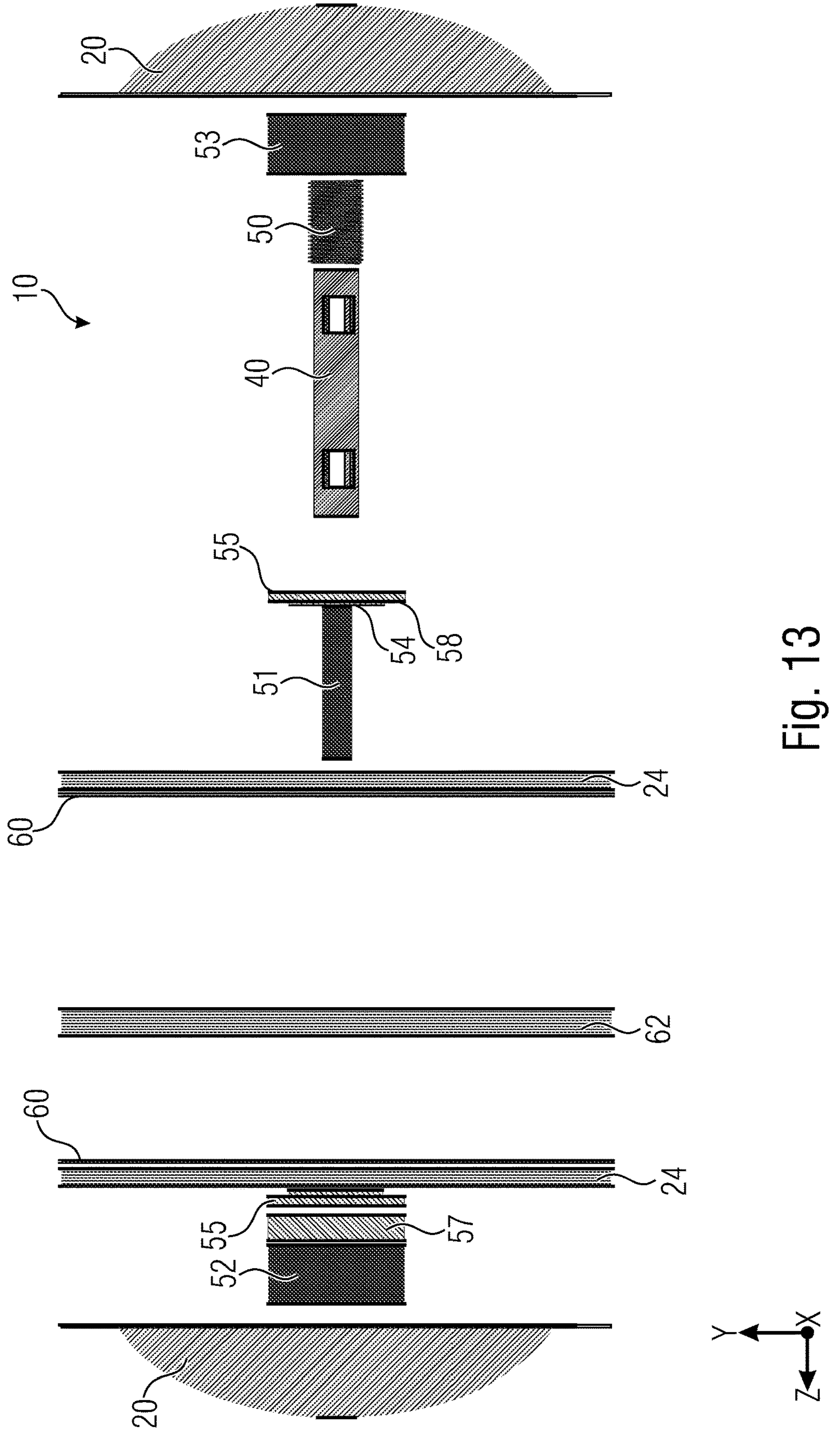
FIG. 13 shows an exploded view of the proposed loudspeaker.

Advantageously, the loudspeaker 10 has a depth of 9 cm in an assembled state, the depth extending from an outermost end point 80 of one diaphragm 20 to an outermost end point 80 of the other diaphragm 20. Since the connecting rod 40 decisively determines the depth of the loudspeaker 10, the connecting rod advantageously has a length of substantially 9 cm. It is also conceivable to design the connecting rod to be longer or shorter, in which case the geometry of the other components described herein may have to be adapted accordingly. In general, it is conceivable to dimension the proposed loudspeaker correspondingly larger or smaller, so that the loudspeaker 10 may be suitably integrated into a further system, such as a vehicle or the like. FIG. 13 shows a schematic exploded view of the proposed loudspeaker 10 described herein, showing the individual components of the loudspeaker, the individual components having already been described in detail with reference to FIGS. 1 to 12.

Figure 14:
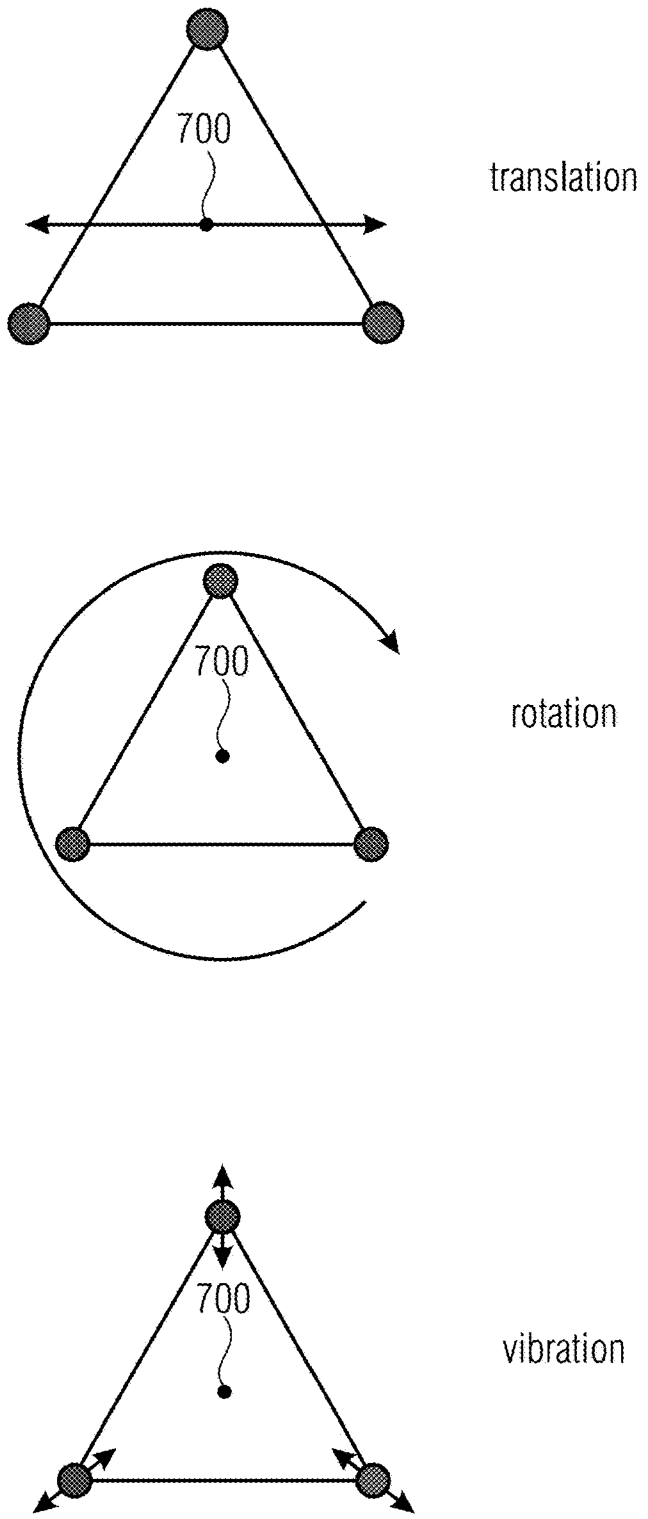
Fig. 14 Prior Art
FIG. 14 shows a schematic representation of a translational vibration, a rotational vibration, and a vibrational vibration on a triatomic molecule.

When sound energy is generated, air molecules, for example diatomic and triatomic gas molecules, are excited. There are three different mechanisms responsible for the stimulation. Reference is made to the German patent DE 198 19 452 CI. These three mechanisms are summarized schematically in FIG. 14. FIG. 14 thus shows a schematic representation of a translational vibration, a rotational vibration, and a vibrational vibration on a triatomic molecule. The first mechanism, or excitation, is translation. Translation describes the linear motion of the air molecules or atoms with respect to the center of mass 700 of the molecule. The second type of excitation is rotation, in which the air molecules or atoms rotate about the center of gravity 700 of the molecule. The center of gravity is indicated at 700 in FIG. 14. The third mechanism is the vibration mechanism, in which the atoms of a molecule move back and forth toward and away from the center of gravity of the molecules.

Figure 15:
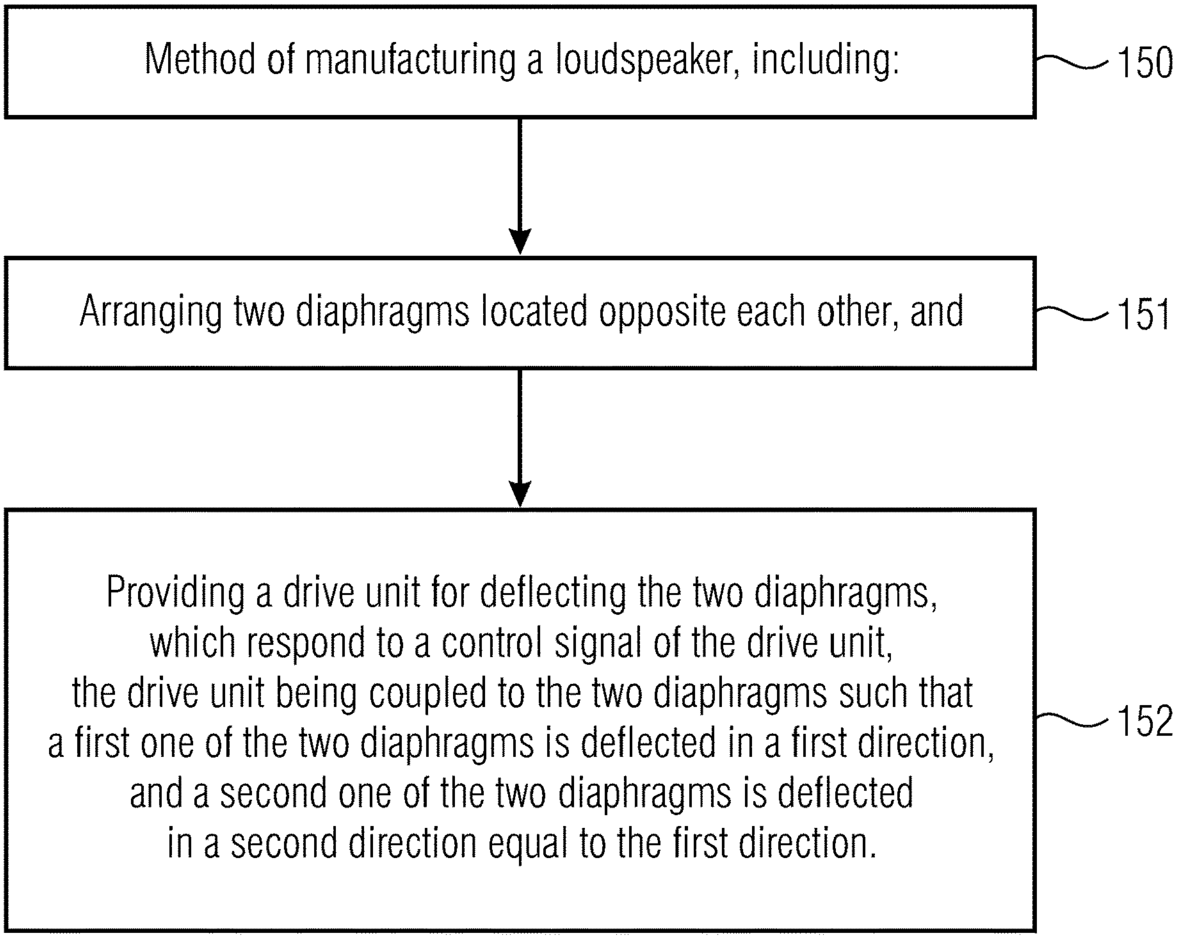
FIG. 15 shows a flow chart of a method of operating a loudspeaker system.

According to another aspect of the proposed invention, a method of manufacturing a loudspeaker 10 (step 150) is proposed. The method 150 includes arranging two diaphragms 20 located opposite each other in a step 151, and providing a drive unit 30 for deflecting the two diaphragms 20 in a step 152. Here, the diaphragms 20 respond to a control signal of the drive unit 30, the drive unit 30 being coupled to the two diaphragms 20 such that a first one of the two diaphragms 20 is deflected in a first direction, and a second one of the two diaphragms 20 is deflected in a second direction equal to the first direction. A flow chart of the method 150 is shown in FIG. 15. The method 150 may further include providing a connecting rod 40 having one end 47 arranged at the first diaphragm 20, and the other end 47 arranged at the second diaphragm 20 so as to rigidly couple the drive unit 30 between the diaphragms 20 to the connecting rod 40. By the length of the connecting rod 40 and by an extension of the diaphragms 20 perpendicularly to the axial axis of the connecting rod 40, a space 22 is spanned within which air may be displaced by the movement of the drive unit 30 before the displaced air encounters a surface of the diaphragms 20 where the air or air column is at least partially reflected or scattered back into the space 22. By varying the extension of the diaphragms 20 and/or the length of the connecting rod 40, the volume of the space 22 may be varied.

The method 150 may further include providing the drive unit 30 with first, second, and third magnets 51, 52, 53 and a voice coil 50 located in a magnetic field of the magnets 51, 52, 53, wherein the control signal is applied to the voice coil 50. The method may include arranging the first magnet 51 within the connecting rod 40; and arranging the second and third magnets 52, 53 and the voice coil 50 around the connecting rod 40 so as to move the connecting rod 40 with respect to the magnets 51, 52, 53 by applying the control signal so that the two diaphragms 20 are excited to vibrate in unison.

Further advantageously, the method 150 may include providing and/or arranging a feature as previously described herein to obtain a loudspeaker 10 as described herein. This means that any feature as described herein may also be understood as a method step for manufacturing the loudspeaker 10.

Figure 16:
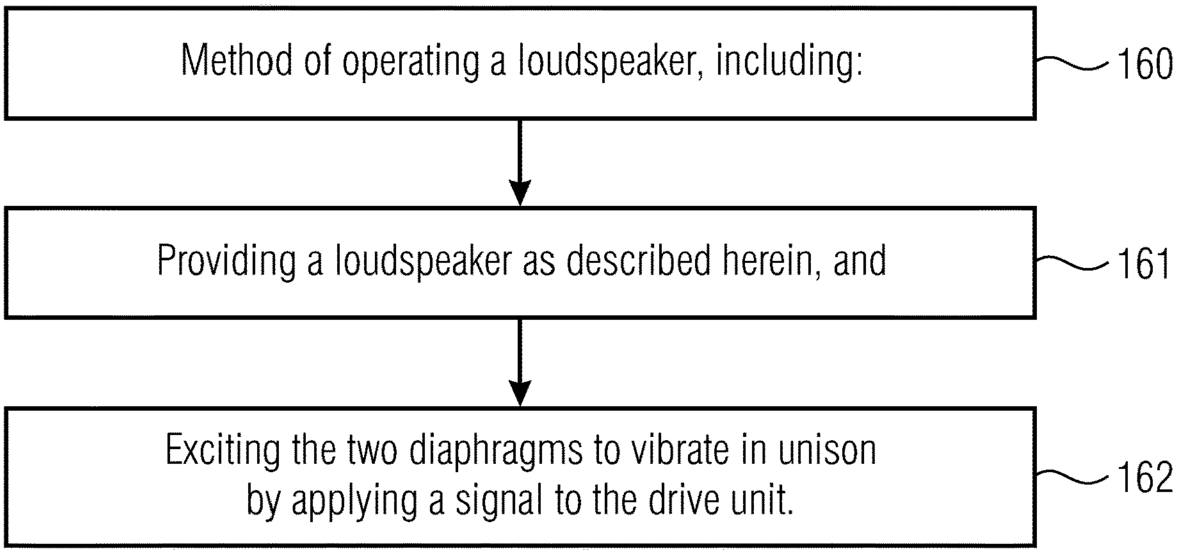
FIG. 16 shows a flow chart of a method of manufacturing a loudspeaker system.

According to a further aspect of the present invention, a method of operating a loudspeaker 10 (step 160) is proposed, which is shown in a flow chart in FIG. 16. The method of operating a loudspeaker 10 includes providing a loudspeaker 10 as described herein in a step 161, and exciting the two diaphragms 20 to vibrate in unison by applying a signal to the drive unit 30 in a step 162. Advantageously, an AC signal is applied to the drive unit 30.

With the loudspeaker proposed herein, a compact loudspeaker is described which may output translational, rotational and vibrational vibrations in a superposition to the external environment so that a listener gets an impression of a live experience.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF REFERENCE NUMERALS

10 loudspeaker
20 diaphragm
22 space
24 diaphragm holder
30 drive unit
40 connecting rod
42 hollow cylinder
44 solid cylinder
46 recess
47 end of connecting rod
48 center of connecting rod
l49 length of recess
50 voice coil
51 first magnet
52 second magnet
53 third magnet
54 magnet holder (inner)
55 magnet holder (outer to receive inner magnet holder 54)
56 magnet holder recess
57 magnet spacer
58 relief
60 grille
62 spacer
70 perforation
80 end point
L40 length of connecting rod
L46 length of recess
L50 length of voice coil
L51 length of first magnet
L52 length of second magnet
L53 length of third magnet
L57 length of magnet holder
700 center of gravity
150 step
151 step
152 step
160 step
161 step
162 step

The invention claimed is:

1. Loudspeaker, comprising:

two diaphragms arranged opposite each other, a drive unit for deflecting the two diaphragms in response to a control signal, wherein the drive unit is coupled to the two diaphragms such that a first one of the two diaphragms is deflected in a first direction and a second one of the two diaphragms is deflected in a second direction equal to the first direction, wherein the drive unit comprises first, second, and third magnets and a voice coil located in a magnetic field of the magnets, wherein the second and third magnets are hollow cylindrical magnets, each arranged around the a rod and each comprising a length smaller than that of the connecting rod, or wherein the second and third magnets are at least partially arranged around the voice coil, or wherein the control signal is applicable to the voice coil, and the voice coil is arranged around the connecting rod to move the connecting rod by applying the control signal with respect to the magnets so that the two diaphragms are excited to vibrate in unison, or wherein the second and third magnets are each engaged, at one end thereof, with a magnet holder, the magnet holders each being coupled to the connecting rod, or wherein a magnet spacer is arranged between the second and third magnets.

2. Loudspeaker as claimed in claim 1, wherein the drive unit is configured to rigidly couple the first and second diaphragms.

3. Loudspeaker as claimed in claim 1, wherein the drive unit is arranged in a space between the diaphragms.

4. Loudspeaker as claimed in claim 1, wherein the drive unit comprises a connecting rod coupled to the first diaphragm at one end and to the second diaphragm at its other end, the drive unit being arranged on and within the connecting rod between the two diaphragms.

5. Loudspeaker as claimed in claim 1, wherein the drive unit for rigid coupling comprises a connecting rod configured as a hollow cylinder and having one end coupled to the first diaphragm and its other end coupled to the second diaphragm.

6. Loudspeaker as claimed in claim 1, wherein the first magnet is a solid cylinder which is arranged within the connecting rod and has a length smaller than that of the connecting rod.

7. Loudspeaker as claimed in claim 1, wherein the magnet holders each engage into a recess of the connecting rod, the recesses of the connecting rod being located closer to an end of the connecting rod than to the center of the connecting rod.

8. Loudspeaker as claimed in claim 7, wherein the recesses extend along the length of the connecting rod so that the connecting rod moves, together with the voice coil mounted on the connecting rod, along the length of the recesses in relation to the three magnets in response to a control signal.

9. Loudspeaker as claimed in claim 1, wherein the loudspeaker comprises a first and a second grille, each grille being located opposite to one of the two diaphragms.

10. Loudspeaker as claimed in claim 9, wherein each grille comprises a plurality of perforations to allow pressure equalization when the two diaphragms are excited to vibrate in unison.

11. Loudspeaker as claimed in claim 10, wherein each perforation has a diameter of 0.1 cm to 0.9 cm.

12. Loudspeaker as claimed in claim 1, wherein each diaphragm is attached, at its outer circumference at one end, to a diaphragm holder and is connected to a grille at a region of the diaphragm holder that is located opposite the outer circumference.

13. Loudspeaker as claimed in claim 9, wherein a spacer is arranged in the region of the drive unit, which spacer is connected, at its outer circumference, to one of the two grilles on both sides in each case.

14. Loudspeaker as claimed in claim 9, wherein the diaphragm holders, the grilles and the diaphragms comprise a diameter of between 10 cm and 30 cm, advantageously between 15 cm and 25 cm, and particularly advantageously of 20.32 cm.

15. Loudspeaker as claimed in claim 9, wherein the connecting rod centrally extends from one diaphragm to the other diaphragm through the two grilles.

16. Loudspeaker as claimed in claim 1, wherein the magnet spacer, which at least partially surrounds the voice coil, is arranged between the two grilles and between the second and third magnets.

17. Loudspeaker as claimed in claim 10, wherein the perforations are arranged on the grilles in a region outside an outer circumference of the magnet spacer.

18. Loudspeaker as claimed in claim 1, the loudspeaker comprising a depth of 9 cm in an assembled state, the depth extending from an outermost end point of one diaphragm to an outermost end point of the other diaphragm.

19. Method of manufacturing a loudspeaker, comprising:
arranging two diaphragms located opposite each other;
providing a drive unit for deflecting the two diaphragms, which respond to a control signal of the drive unit, the drive unit being coupled to the two diaphragms such that a first one of the two diaphragms is deflected in a first direction, and a second one of the two diaphragms is deflected in a second direction equal to the first direction;
providing the drive unit which has first, second, and third magnets and a voice coil located in a magnetic field of the magnets, wherein the control signal may be applied to the voice coil;
arranging the first magnet within the connecting rod; and
arranging the second and third magnets and the voice coil around the connecting rod so as to move the connecting rod by applying the control signal with respect to the magnets so that the two diaphragms are excited to vibrate in unison.

20. Method as claimed in claim 19, comprising:
providing a connecting rod having one end disposed on the first diaphragm and the other end disposed on the second diaphragm to rigidly couple the drive unit between the diaphragms to the connecting rod.

21. Method as claimed in claim 19, comprising:
providing and/or arranging a feature as claimed in claim 1 to acquire a loudspeaker comprising:
two diaphragms arranged opposite each other,
a drive unit for deflecting the two diaphragms in response to a control signal, wherein the drive unit is coupled to the two diaphragms such that a first one of the two diaphragms is deflected in a first direction and a second one of the two diaphragms is deflected in a second direction equal to the first direction.

22. Method of operating a loudspeaker, comprising:
providing a loudspeaker as claimed in claim 1, and
exciting the two diaphragms to vibrate in unison by applying a signal to the drive unit.

23. Loudspeaker, comprising:
two diaphragms arranged opposite each other,
a drive unit for deflecting the two diaphragms in response to a control signal, wherein the drive unit is coupled to the two diaphragms such that a first one of the two diaphragms is deflected in a first direction and a second one of the two diaphragms is deflected in a second direction equal to the first direction,
wherein each diaphragm is attached, at its outer circumference at one end, to a diaphragm holder and is connected to a grille at a region of the diaphragm holder that is located opposite the outer circumference.

24. Loudspeaker, comprising:
two diaphragms arranged opposite each other,
a drive unit for deflecting the two diaphragms in response to a control signal, wherein the drive unit is coupled to the two diaphragms such that a first one of the two diaphragms is deflected in a first direction and a second one of the two diaphragms is deflected in a second direction equal to the first direction, wherein
the loudspeaker comprises a first and a second grille, each grille being located opposite to one of the two diaphragms, wherein
each grille comprises a plurality of perforations to allow pressure equalization when the two diaphragms are excited to vibrate in unison, or
wherein a spacer is arranged in the region of the drive unit, which spacer is connected, at its outer circumference, to one of the two grilles on both sides in each case, or
the diaphragm holders, the grilles and the diaphragms comprise a diameter of between 10 cm and 30 cm, advantageously between 15 cm and 25 cm, and particularly advantageously of 20.32 cm, or
wherein the connecting rod centrally extends from one diaphragm to the other diaphragm through the two grilles.

* * * * *